United States Patent
Biermann et al.

(10) Patent No.: US 12,027,713 B2
(45) Date of Patent: Jul. 2, 2024

(54) SAFETY CONTAINER FOR GALVANIC CELLS

(71) Applicant: Volkswagen Aktiengesellschaft, Wolfsburg (DE)

(72) Inventors: Thomas Biermann, Dortmund (DE); Jasmin Kahkaschan, Wolfsburg (DE)

(73) Assignee: VOLKSWAGEN AKTIENGESELLSCHAFT, Wolfsburg (DE)

( * ) Notice: Subject to any disclaimer, the term of this patent is extended or adjusted under 35 U.S.C. 154(b) by 221 days.

(21) Appl. No.: 17/426,844

(22) PCT Filed: Feb. 3, 2020

(86) PCT No.: PCT/EP2020/052586
§ 371 (c)(1),
(2) Date: Jul. 29, 2021

(87) PCT Pub. No.: WO2020/161060
PCT Pub. Date: Aug. 13, 2020

(65) Prior Publication Data
US 2022/0115726 A1 Apr. 14, 2022

(30) Foreign Application Priority Data

Feb. 4, 2019 (DE) .................... 10 2019 201 365.1
Jul. 12, 2019 (DE) .................... 10 2019 210 367.7

(51) Int. Cl.
*H01M 50/24* (2021.01)
*H01M 50/119* (2021.01)
(Continued)

(52) U.S. Cl.
CPC ....... *H01M 50/202* (2021.01); *H01M 50/119* (2021.01); *H01M 50/147* (2021.01);
(Continued)

(58) Field of Classification Search
CPC .. H01M 50/24; H01M 10/658; H01M 50/202; H01M 50/383
See application file for complete search history.

(56) References Cited

U.S. PATENT DOCUMENTS 4,598,005 A * 7/1986 Ziegenbein ......... H01M 10/658
220/62.19
5,051,322 A * 9/1991 Hasenauer .......... H01M 10/658
220/592.2
(Continued)

FOREIGN PATENT DOCUMENTS

| DE | 102013222269 A1 | 4/2015 | .............. H01M 2/10 |
| DE | 102013113880 A1 | 6/2015 | .............. H01M 2/02 |

(Continued)

OTHER PUBLICATIONS

International Search Report and Written Opinion, Application No. PCT/EP2020/052586, 6 pages, Apr. 22, 2020.

(Continued)

*Primary Examiner* — Imran Akram
(74) *Attorney, Agent, or Firm* — Slayden Grubert Beard PLLC

(57) ABSTRACT

The invention relates to a safety container for galvanic cells, comprising an outer container and at least one inner container, wherein the inner container forms the transportation space for the galvanic cells, wherein a cavity is formed between the inner container and outer container, wherein the inner container and the cavity between the inner container and outer container are provided with inert filling material, wherein the cavity is designed to be gas-tight in relation to the inner container and gas-tight in relation to the exterior surroundings of the safety container, wherein the inner container is connected to the exterior surroundings via at least one tube through the cavity, wherein a pressure valve (Continued)

and/or a connection to an exhaust-air system is arranged at the outer end of the tube.

15 Claims, 4 Drawing Sheets

(51) Int. Cl.
*H01M 50/147* (2021.01)
*H01M 50/202* (2021.01)
*H01M 50/293* (2021.01)
*H01M 50/30* (2021.01)
*H01M 50/317* (2021.01)
*H01M 50/204* (2021.01)
*H01M 50/224* (2021.01)
*H01M 50/271* (2021.01)

(52) U.S. Cl.
CPC ......... *H01M 50/24* (2021.01); *H01M 50/293* (2021.01); *H01M 50/30* (2021.01); *H01M 50/317* (2021.01); *H01M 50/394* (2021.01); *H01M 50/204* (2021.01); *H01M 50/224* (2021.01); *H01M 50/271* (2021.01)

(56) References Cited

U.S. PATENT DOCUMENTS

| 2013/0146603 | A1  | 6/2013 | Brilmyer | 220/560.01 |
| 2016/0049706 | A1* | 2/2016 | Kerspe | H01M 10/6555 |
| | | | | 429/120 |
| 2017/0155103 | A1  | 6/2017 | Pasewald | 206/703 |
| 2017/0214010 | A1* | 7/2017 | Kerspe | H01M 10/655 |

FOREIGN PATENT DOCUMENTS

| DE | 102014200879 A1 | 7/2015  | ............. B65D 25/10 |
| DE | 102014110654 A1 | 2/2016  | ............. A62D 1/00 |
| DE | 102017107904 A1 | 10/2018 | ............. B65D 81/00 |
| WO | 2013/020704 A2  | 2/2013  | ............. A62C 3/16 |
| WO | 2020/161060 A1  | 8/2020  | ............. H01M 2/10 |

OTHER PUBLICATIONS

German Office Action, Application No. 102019210367.7, 4 pages, Sep. 12, 2019.

* cited by examiner

SAFETY CONTAINER FOR GALVANIC CELLS

CROSS-REFERENCE TO RELATED APPLICATIONS

This application claims priority to German Patent Application No. DE 10 2019 201 365.1, filed on Feb. 4, 2019 with the German Patent and Trademark Office and to German Patent Application No. DE 10 2019 210 367.7, filed on Jul. 12, 2019 with the German Patent and Trademark Office. The contents of the aforesaid Patent Applications are incorporated herein for all purposes.

TECHNICAL FIELD

The invention relates to a safety container for galvanic cells.

BACKGROUND

This background section is provided for the purpose of generally describing the context of the disclosure. Work of the presently named inventor(s), to the extent the work is described in this background section, as well as aspects of the description that may not otherwise qualify as prior art at the time of filing, are neither expressly nor impliedly admitted as prior art against the present disclosure.

Within the context of the present invention, devices for spontaneously converting chemical into electrical energy that can be divided into the following three groups are understood to be galvanic cells:
  a) Primary cells, colloquially also referred to as a battery, wherein the cell is charged and can only be discharged once. The discharge is irreversible and the primary cell can no longer be electrically charged.
  b) Secondary cells, colloquially also referred to as an accumulator. After discharge, secondary cells can be recharged by means of a current that flows in an opposite direction to the discharge. Lithium ion-based cells are a particular example.
  c) Fuel cells, also referred to as tertiary cells. In these galvanic cells, the chemical energy carrier is continuously supplied from outside. This enables continuous and, in principle, temporally unrestricted operation.

SUMMARY

An object exists to improve a safety container for galvanic cells.

The object is solved by a safety container having the features of the independent claim(s). Embodiments of the invention are described in the dependent claims, the following description, and the drawings.

DESCRIPTION

Figure 1:
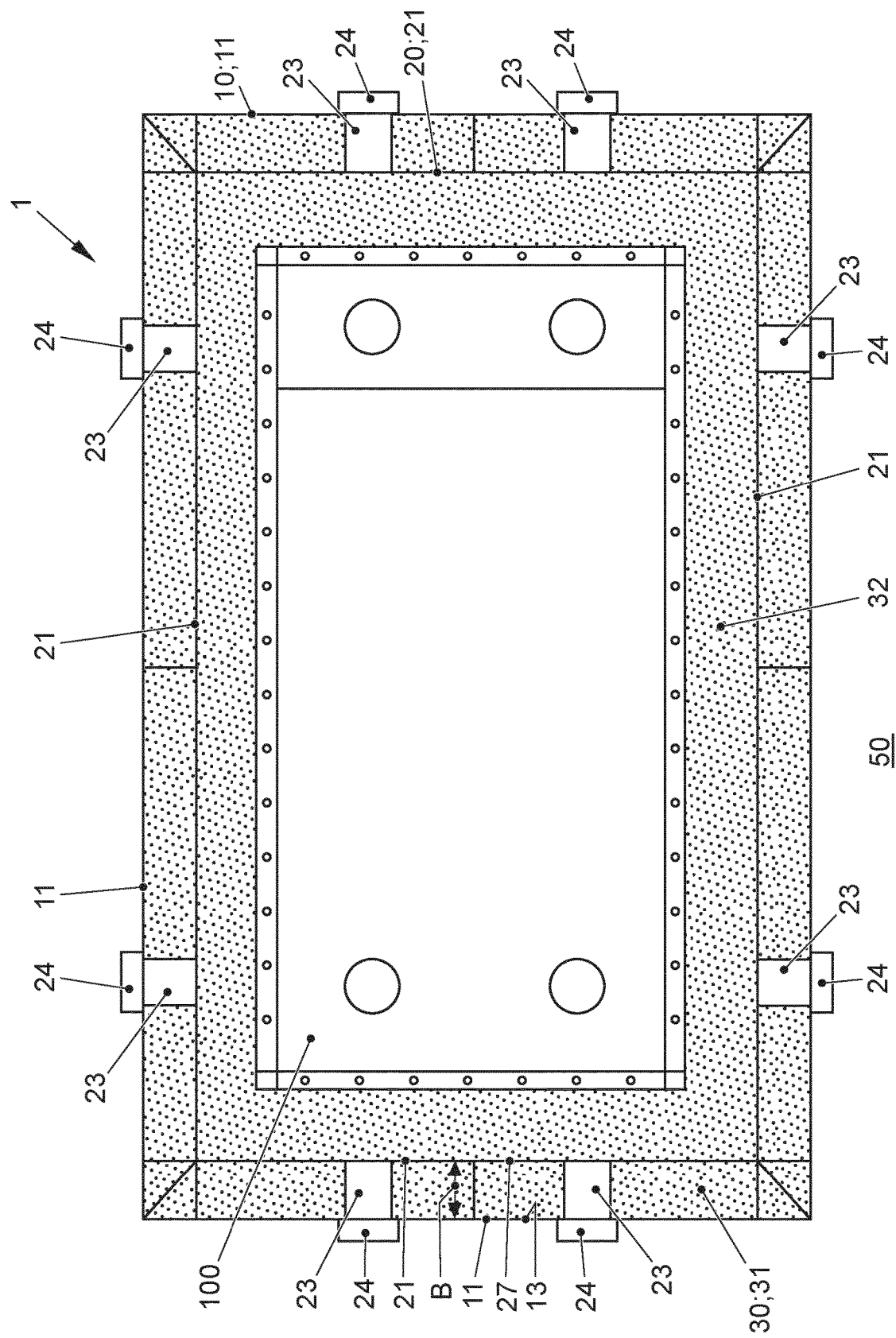
FIG. 1 is a schematic plan view of an exemplary safety container without a cover.

The details of one or more embodiments are set forth in the accompanying drawings and the description below. Other features will be apparent from the description, drawings, and from the claims.

In the following description of embodiments of the invention, specific details are described in order to provide a thorough understanding of the invention. However, it will be apparent to one of ordinary skill in the art that the invention may be practiced without these specific details. In other instances, well-known features have not been described in detail to avoid unnecessarily complicating the instant description.

In a first exemplary aspect, the safety container for galvanic cells comprises an outer container and at least one inner container, wherein the inner container forms the receiving space for the galvanic cells. The inner and outer container are oriented relative to one another such that a cavity is formed between them. Both the inner container and the cavity between the inner container and outer container are provided with inert filling material. The same filling material may be used, but it is also possible for different filling materials to be used. In some embodiments, the filling materials are also non-flammable and electrically non-conductive. The cavity is designed to be gas-tight in relation to the inner container and gas-tight in relation to the exterior surroundings of the safety container, wherein the inner container is connected to the exterior surroundings via at least one tube through the cavity, wherein a pressure valve and/or a connection to an exhaust-air system is arranged at the outer end of the tube. As a result, an overpressure in the inner container can be relieved without oxygen being able to enter from outside. By virtue of the gas-tight design of the cavity in relation to the inner space, gases that may be produced in the inner space are prevented from flowing into the cavity and onto the inner side of the outer container, which would result in undesired heating of the outer container. The primary task of the cavity having the filling material is therefore to provide thermal insulation or thermal shielding. Furthermore, the inner side of the outer container and the outer side of the inner container are not chemically attacked by any substances. The number of tubes is in some embodiments selected depending on the size of the inner container.

By means of the safety container according to the present exemplary aspect, galvanic cells can be transported, stored, or operated safely. The safety container may be used in buildings or in the open air and it may be stationary or mobile during use. In the case of applications in buildings, in particular, the outer end of the tube is connected to an active or passive exhaust-air system in order to protect the inside air.

In some embodiments, the outer container and the inner container are made of steel, for example stainless steel.

In some embodiments, the outer container and the inner container have a common releasable cover that may for example be screwed on. As a result, the process of loading and unloading the galvanic cells into and from the safety container is simplified. Furthermore, the cover may for example be double-walled, wherein filling material is for example arranged between the walls of the cover.

In some embodiments, parts of the inner container are rigidly connected to the outer container. In embodiments made of steel, said parts may for example be welded. In some embodiments, all parts of the inner and outer container are rigidly connected, with the exception of the common cover. This simplifies the gas-tight formation of the cavity and provides greater stability.

In some embodiments, the filling material is a silicate, for example expanded glass or glass wool or rock wool. The expanded glass may for example be in the form of loose hollow glass granules and for example have an average diameter of between 0.1 mm and 10 mm, for example between 0.1 mm and 5 mm. The filling material may for example have a melting point of greater than 900° C., e.g., greater than 1,000° C.

In some embodiments, means that prevent filling material from entering the tube are provided at the inner end of the tube. Said means may for example be a nonwoven fabric or a filter. The nonwoven fabric or sieve for example may consist of a material that is resistant to high temperatures with a melting point within the range of the filling materials. For the sieve, plastics material or metal is for example used. To protect the sieve, impact protection may also be provided in order to prevent the sieve from being damaged.

In some embodiments, the width of the cavity between the outer side of the inner container and the inner side of the outer container is always at least 0.1 m, for example at least 0.2 m.

If the galvanic cells are to be electrically operated in the safety container, the outer container and the inner container each comprise gas-tight feedthroughs for load cables and/or data lines. In this case, the cells may for example be designed as battery modules or battery units that each comprise their own housing. If the electrical load is not arranged in the safety container as well, load cables must be guided to the outside from the battery poles through the safety container in a gas-tight manner. The same applies to data lines for transmitting data of voltage and/or temperature sensors of the cells to the outside or for transmitting control commands to control units inside the safety container, for example. Embodiments in which load cables and data cables are guided through the same feedthrough are also possible. This may be beneficial if the currents in the load cable are not too large. However, if the current in the load cables is for example greater than 1 A, load and data cables are for example guided separately, such that the data cables are not disrupted by the magnetic fields of the load cables.

In some embodiments, the outer container and the inner container each comprise gas-tight feedthroughs for coolant lines. The coolant lines may for example transport gases or liquids. This makes it possible to restrict the cooling to the space of the inner container. However, the cooling lines may also be connected to a cooling apparatus inside the battery modules or battery unit.

The invention is explained in the following in more detail using further exemplary embodiments.

Specific references to components, process steps, and other elements are not intended to be limiting. Further, it is understood that like parts bear the same or similar reference numerals when referring to alternate FIGS. It is further noted that the FIGS. are schematic and provided for guidance to the skilled reader and are not necessarily drawn to scale. Rather, the various drawing scales, aspect ratios, and numbers of components shown in the FIGS. may be purposely distorted to make certain features or relationships easier to understand.

FIG. 1 is a schematic plan view of a safety container 1 for transporting galvanic cells 100. The safety container 1 comprises an outer container 10, which comprises four side walls 11 and a base 12 (see FIG. 2). Furthermore, the safety container 1 comprises an inner container 20, which comprises four side walls 21 and a base 22 (see FIG. 2). The galvanic cells 100 are arranged in the inner container 20. A cavity 30 is formed between the inner container 20 and the outer container 10. Said cavity 30 is filled with inert filling material 31 that is for example non-flammable and electrically non-conductive. For example, the filling material is expanded glass, in particular loose hollow glass granules. The inner container 20 is also filled with inert filing material 32 in such a way that said material covers the galvanic cells 100. The cavity 30 is designed to be gas-tight in relation to the inner container 20 and gas-tight in relation to the exterior surroundings 50 of the safety container 1. The inner container 20 is connected to the exterior surroundings 50 via multiple tubes 23 through the cavity 30, wherein pressure valves 24 are arranged at the outer end of the tubes 23. The tubes 23 are for example DN50 tubes. A sieve 25 and impact protection 26 is arranged at the inner end of each tube 23. The outer container 10 and the inner container 20 are for example made of stainless steel and rigidly interconnected, for example, welded to one another. The width B of the cavity 30 between the outer side 27 of the inner container 20 and the inner side 13 of the outer container 10 is for example at least 0.1 m, for example 0.2 m.

Figure 2:
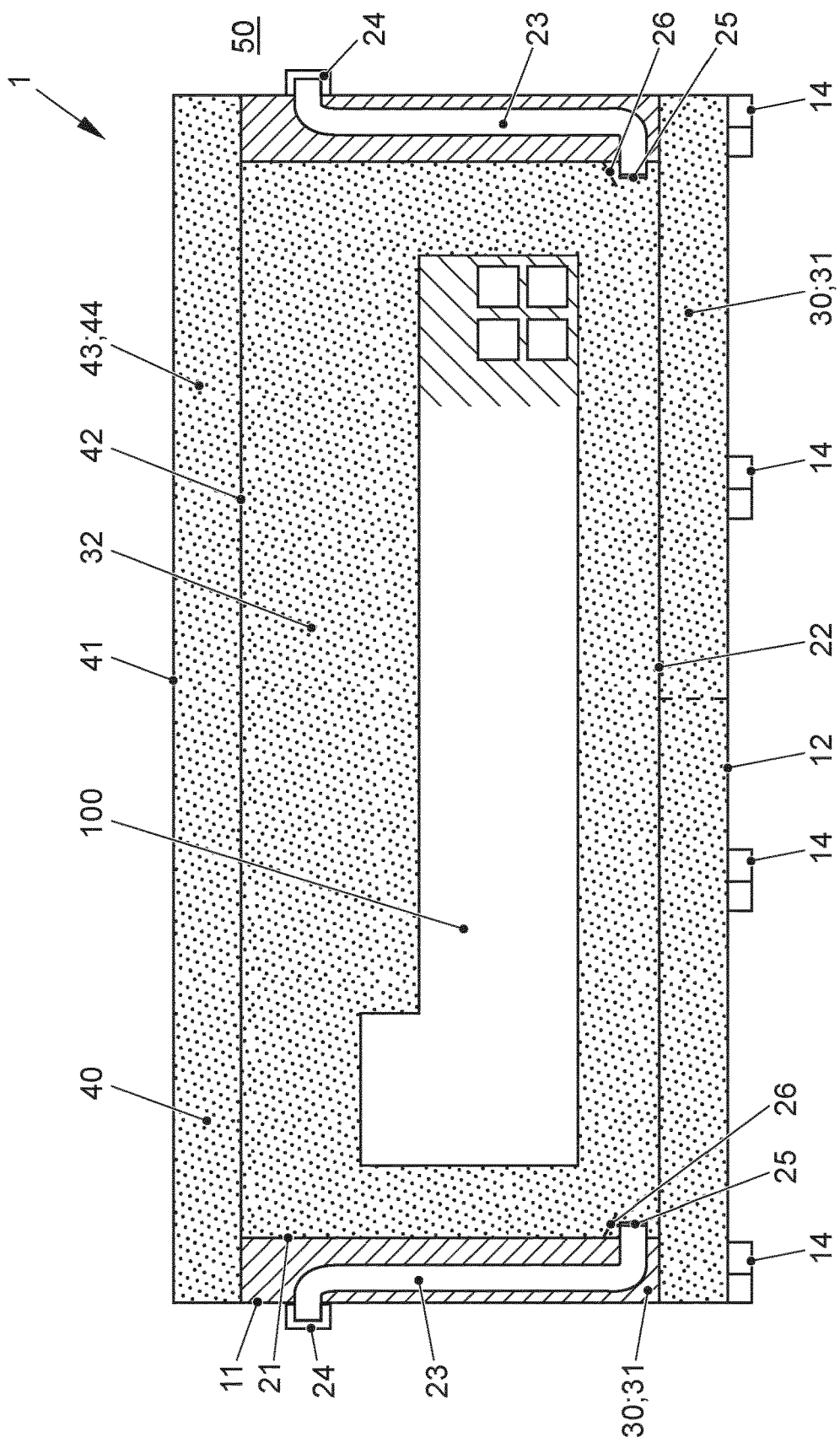
FIG. 2 is an exemplary schematic side view.
Figure 3:
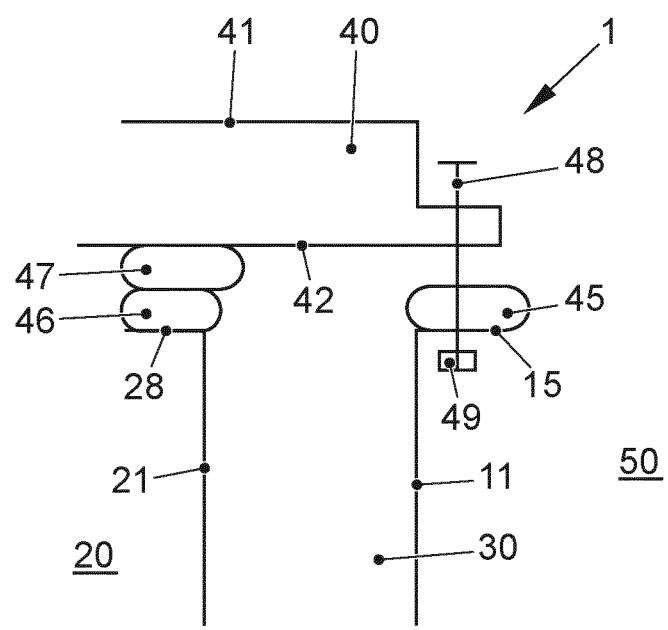
FIG. 3 is a schematic detailed and exemplary representation of the connection between the cover and side walls.

The inner container 20 and outer container 10 are closed at the top by means of a common cover 40 (see FIG. 2). Feet 14 that for example form an entry space for a forklift truck are arranged on the base 12 of the outer container 10. The cover 40 is double-walled and comprises an outer side 41 and an inner side 42, between which a cavity 43 filled with inert filling material 44 is formed. For example, the same material is used for the filling materials 31, 32 and 44, but this is not strictly necessary.

The cover 40 is screwed to the outer container 10. For this purpose, the side walls 11 comprise a projection 15, wherein a first seal 45 is arranged between the cover 40 and the projection 15. The side walls 21 of the inner container 20 also comprise a projection 28, on which rests a second seal 46, wherein a third seal 47 is arranged opposite in the cover 40. The cover 40 is then screwed on at multiple points by means of screws 48 and nuts 49 such that the cover 40 compresses the seals 45-47. As a result, the cavity 30 is sealed so as to be gas-tight in relation to the exterior surroundings 50 as well as in relation to the inner container 20. It is also possible to use just one single seal instead of two seals 46, 47 on the side wall 21. If the side wall 21 is sufficiently wide, the projection 28 can be dispensed with.

Figure 4:
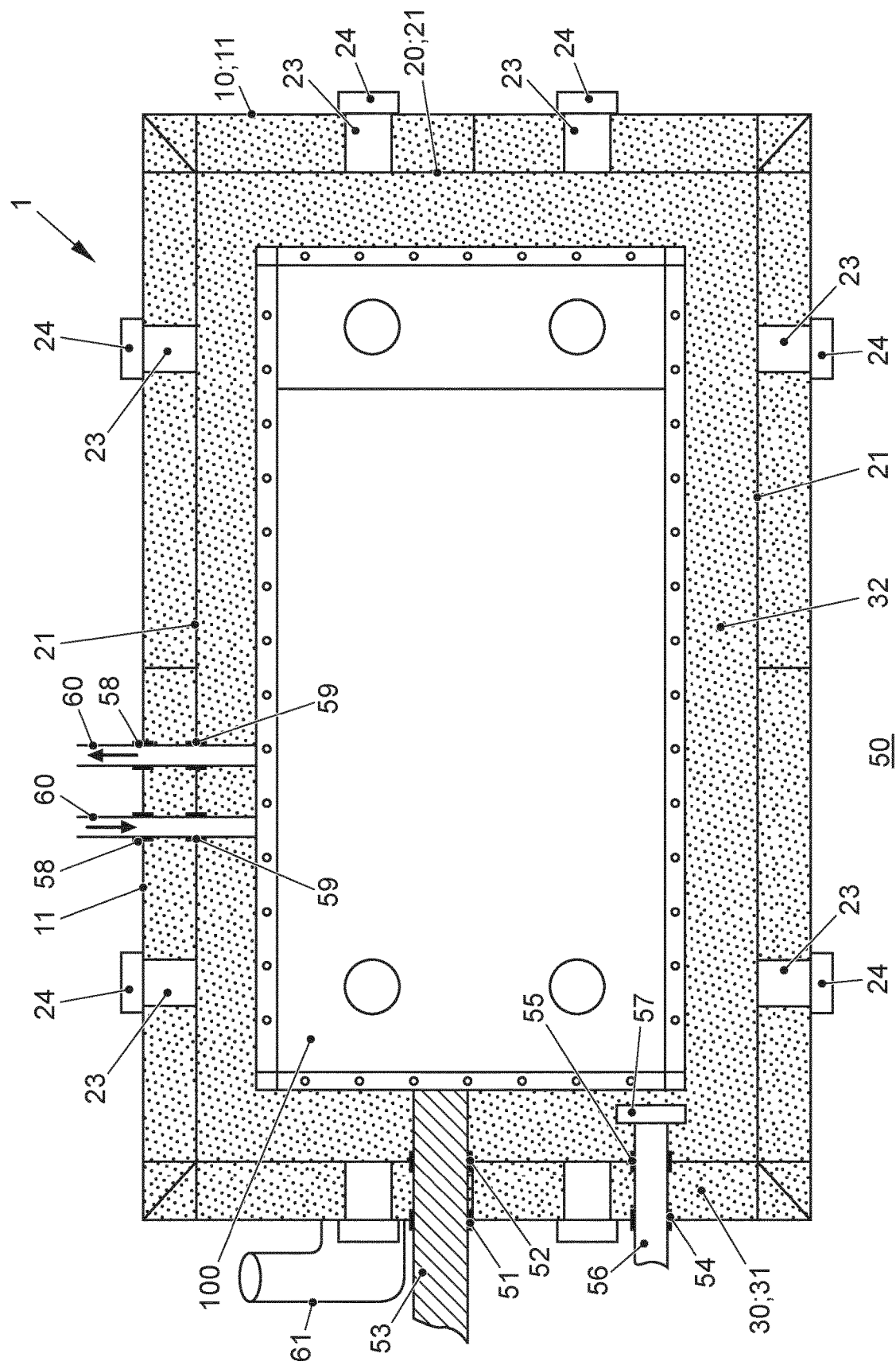
FIG. 4 is a schematic plan view of a safety container without a cover according to a second embodiment.

FIG. 4 shows an alternative embodiment of the safety container 1, which is used if the galvanic cells 100 are electrically operated. For this purpose, the outer container 10 and the inner container 20 each comprise gas-tight feedthroughs 51, 52 for load cables 53, which are then connected to corresponding connections (e.g. pole terminals) of the galvanic cells 100. Furthermore, the outer container 10 and the inner container 20 each comprise gas-tight feedthroughs 54, 55 for data lines 56, which are gathered together by means of a suitable connector 57, for example, and which may be connected to electronic units such as sensors and control units of the cells 100 by means of a mating connector (not shown). Furthermore, the safety container 1 comprises gas-tight feedthroughs 58, 59 for coolant lines 60 in the outer container 10 and inner container 20, such that the cells 100 can be cooled during operation. Finally, the safety container 1 comprises connections 61 at the pressure valves 24 for an exhaust-air system, wherein only one connection 61 is shown in the top left for the sake of clarity. A hose or tube can then be fastened to the connection 61 in order to remove the gases produced in the inner container 20.

A battery unit having a plurality of cells 100 can therefore be operated by means of the safety container 1, wherein the risk of fire or the leakage of harmful substances in the event of damage is effectively prevented by means of the safety container 1. As such, larger battery units can be used in places where particularly stringent requirements are imposed with regard to fire protection.

LIST OF REFERENCE NUMERALS

1 Safety container
10 Outer container
11 Side wall
12 Base
13 Inner side
14 Feet
15 Projection
20 Inner container
21 Side wall
22 Base
23 Tube
24 Pressure valve
25 Sieve
26 Impact protection
27 Outer side
28 Projection
30 Cavity
31 Filling material
32 Filling material
40 Cover
41 Outer side
42 Inner side
43 Cavity
44 Filling material
45 Seal
46 Seal
47 Seal
48 Screw
49 Nut
50 Exterior surroundings
51 Gas-tight feedthrough, outer container
52 Gas-tight feedthrough, inner container
53 Load cable
54 Gas-tight feedthrough, outer container
55 Gas-tight feedthrough, inner container
56 Data line
57 Connector
58 Gas-tight feedthrough, outer container
59 Gas-tight feedthrough, inner container
60 Coolant line
61 Connection
100 Galvanic cells
B Width The invention has been described in the preceding using various exemplary embodiments. Other variations to the disclosed embodiments may be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor, module or other unit or device may fulfill the functions of several items recited in the claims.

The term "exemplary" used throughout the specification means "serving as an example, instance, or exemplification" and does not mean "preferred" or "having advantages" over other embodiments.

The mere fact that certain measures are recited in mutually different dependent claims or embodiments does not indicate that a combination of these measures cannot be used to advantage. Any reference signs in the claims should not be construed as limiting the scope.

What is claimed is:

1. A safety container for galvanic cells comprising:
   an outer container and at least one inner container, wherein:
   the inner container forms a receiving space for the galvanic cells;
   a cavity is formed between the inner container and outer container;
   the inner container and the cavity between the inner container and outer container are provided with inert filling material;
   the cavity is configured to be gas-tight in relation to the inner container;
   the cavity is configured to be gas-tight in relation to the exterior surroundings of the safety container;
   the inner container is connected to the exterior surroundings via at least one tube having an inner end and an outer end, the tube extending through the cavity;
   at least one of a pressure valve and a connection to an exhaust-air system is arranged at the outer end of the tube;
   a sieve is arranged at the inner end of the tube;
   the sieve is configured with impact protection in order to prevent the sieve from being damaged;
   the outer container and the inner container are made of steel; and
   parts of the inner container are rigidly connected to the outer container by welding.

2. The safety container of claim 1, wherein the outer container and the inner container comprise a common releasable cover.

3. The safety container of claim 2, wherein the cover is double-walled forming a cover cavity, wherein inert filling material is in the cover cavity.

4. The safety container of claim 2, wherein one or more compression seals are arranged between the cover and one or more of the outer container and the inner container.

5. The safety container of claim 1, wherein the filling material is a silicate.

6. The safety container of claim 1, wherein a width of the cavity between an outer side of the inner container and an inner side of the outer container is at least 0.1 m.

7. The safety container of claim 1, wherein the outer container and the inner container each comprise gas-tight feedthroughs for one or more of load cables and data lines.

8. The safety container of claim 1, wherein the outer container and the inner container each comprise gas-tight feedthroughs for coolant lines.

9. The safety container of claim 1, wherein the sieve is made from a material that is resistant to high temperatures.

10. The safety container of claim 1, wherein the filling material has a melting point of greater than 900° C.

11. The safety container of claim 1, wherein the filling material comprises expanded glass in the form of hollow glass granules.

12. The safety container of claim 1, wherein the tube comprises at least one bend.

13. The safety container of claim 1, wherein
   the inner container has multiple sides; and wherein
   the inner container is connected to the exterior surroundings via multiple tubes, wherein at least one of the tubes is arranged on each side of the inner container.

14. The safety container of claim 13, wherein multiple tubes are arranged on each side of the inner container.

15. The safety container of claim 1, wherein the inner container comprises one or more galvanic cells.

\* \* \* \* \*